US007988906B2

(12) United States Patent
Monsheimer et al.

(10) Patent No.: US 7,988,906 B2
(45) Date of Patent: Aug. 2, 2011

(54) THREE-DIMENSIONAL LAYER-BY-LAYER PRODUCTION PROCESS WITH POWDERS BASED ON CYCLIC OLIGOMERS

(75) Inventors: Sylvia Monsheimer, Haltern am See (DE); Alexander Richter, Oer-Erkenschwick (DE)

(73) Assignee: Evonik Degussa GmbH, Essen (DE)

( * ) Notice: Subject to any disclaimer, the term of this patent is extended or adjusted under 35 U.S.C. 154(b) by 1072 days.

(21) Appl. No.: 11/484,593

(22) Filed: Jul. 12, 2006

(65) Prior Publication Data

US 2007/0013108 A1  Jan. 18, 2007

(30) Foreign Application Priority Data

Jul. 16, 2005   (DE) .......................... 10 2005 033 379

(51) Int. Cl.
B29C 35/08  (2006.01)
H05B 6/00  (2006.01)
B27N 3/00  (2006.01)

(52) U.S. Cl. .................... 264/497; 264/482; 264/109

(58) Field of Classification Search ................... None
See application file for complete search history.

(56) References Cited

U.S. PATENT DOCUMENTS

| 4,944,817 | A | * | 7/1990 | Bourell et al. ............ 264/497 |
| 5,405,936 | A | | 4/1995 | Mumcu et al. |
| 5,668,242 | A | | 9/1997 | Simon et al. |
| 5,932,687 | A | | 8/1999 | Baumann et al. |
| 6,060,550 | A | | 5/2000 | Simon et al. |
| 6,136,948 | A | * | 10/2000 | Dickens et al. ............ 528/323 |
| 6,149,836 | A | | 11/2000 | Mumcu et al. |
| 6,300,413 | B1 | | 10/2001 | Simon et al. |
| 6,316,537 | B1 | | 11/2001 | Baumann et al. |
| 6,335,101 | B1 | | 1/2002 | Haeger et al. |
| 6,403,851 | B1 | | 6/2002 | Wilczok et al. |
| 6,407,304 | B2 | | 6/2002 | Schiffer et al. |
| 6,444,855 | B1 | | 9/2002 | Esser et al. |
| 6,462,235 | B1 | | 10/2002 | Thiele et al. |
| 6,566,555 | B2 | | 5/2003 | Thiele et al. |
| 6,579,581 | B2 | | 6/2003 | Bartz et al. |
| 6,589,606 | B2 | | 7/2003 | Waterkamp et al. |
| 6,610,864 | B2 | | 8/2003 | Krebs et al. |
| 6,620,970 | B2 | | 9/2003 | Schiffer et al. |
| 6,639,108 | B2 | | 10/2003 | Schiffer et al. |
| 6,656,997 | B2 | | 12/2003 | Baumann et al. |
| 6,664,423 | B2 | | 12/2003 | Herwig et al. |
| 6,677,015 | B2 | | 1/2004 | Himmelmann et al. |
| 6,766,091 | B2 | | 7/2004 | Beuth et al. |
| 6,784,227 | B2 | | 8/2004 | Simon et al. |
| 6,852,893 | B2 | | 2/2005 | Kühnle et al. |
| 6,884,485 | B2 | | 4/2005 | Baumann et al. |
| 7,025,842 | B2 | | 4/2006 | Monsheimer et al. |
| 7,060,347 | B2 | | 6/2006 | Monsheimer et al. |
| 2002/0113331 | A1 | * | 8/2002 | Zhang et al. ............ 264/40.1 |
| 2003/0114636 | A1 | | 6/2003 | Schiffer et al. |
| 2003/0124281 | A1 | | 7/2003 | Ries et al. |
| 2003/0191223 | A1 | | 10/2003 | Waterkamp et al. |
| 2004/0097636 | A1 | | 5/2004 | Baumann et al. |
| 2004/0102539 | A1 | | 5/2004 | Monsheimer et al. |
| 2004/0106691 | A1 | | 6/2004 | Monsheimer et al. |
| 2004/0137228 | A1 | | 7/2004 | Monsheimer et al. |
| 2004/0138363 | A1 | | 7/2004 | Baumann et al. |
| 2004/0140668 | A1 | | 7/2004 | Monsheimer et al. |
| 2004/0180980 | A1 | | 9/2004 | Petter et al. |
| 2004/0204531 | A1 | | 10/2004 | Baumann et al. |
| 2004/0232583 | A1 | | 11/2004 | Monsheimer et al. |
| 2005/0014842 | A1 | | 1/2005 | Baumann et al. |
| 2005/0027047 | A1 | | 2/2005 | Monsheimer et al. |
| 2005/0027050 | A1 | | 2/2005 | Monsheimer et al. |
| 2005/0038201 | A1 | | 2/2005 | Wursche et al. |
| 2006/0071359 | A1 | | 4/2006 | Monsheimer et al. |
| 2006/0134419 | A1 | | 6/2006 | Monsheimer et al. |
| 2006/0135670 | A1 | | 6/2006 | Richter et al. |
| 2006/0182916 | A1 | | 8/2006 | Dowe et al. |
| 2006/0183869 | A1 | | 8/2006 | Dowe et al. |
| 2006/0189784 | A1 | | 8/2006 | Monsheimer et al. |
| 2006/0202395 | A1 | | 9/2006 | Monsheimer et al. |
| 2006/0223928 | A1 | | 10/2006 | Monsheimer et al. |
| 2006/0281873 | A1 | | 12/2006 | Alting et al. |
| 2007/0104971 | A1 | | 5/2007 | Wursche et al. |
| 2007/0166560 | A1 | | 7/2007 | Wursche et al. |
| 2008/0119632 | A1 | | 5/2008 | Baumann et al. |
| 2008/0166529 | A1 | | 7/2008 | Hager et al. |
| 2008/0213552 | A1 | | 9/2008 | Hager et al. |
| 2008/0217821 | A1 | | 9/2008 | Goring et al. |
| 2008/0249237 | A1 | | 10/2008 | Hager et al. |

FOREIGN PATENT DOCUMENTS

| EP | 1 111 012 A9 | 6/2001 |
| EP | 1 388 411 A1 | 2/2004 |
| EP | 1 674 497 A1 | 6/2006 |
| WO | WO 0138061 A1 * | 5/2001 |
| WO | WO 2005/090056 A1 | 9/2005 |
| WO | WO 2005/105412 A1 | 11/2005 |

OTHER PUBLICATIONS

Howard W. Starkweather Jr., Paul Zoller, Glover A. Jones; The heat of fusion of poly(ethylene terephthalate); Mar. 11, 2003; Journal of Polymer Science: Polymer Physics Edition; vol. 21 Issue 2, pp. 295-299.*
U.S. Appl. No. 11/694,129, filed Mar. 30, 2007, Monsheimer, et al.
U.S. Appl. No. 11/671,820, filed Feb. 6, 2007, Monsheimer, et al.
U.S. Appl. No. 12/105,672, filed Apr. 18, 2008, Simon, et al.
U.S. Appl. No. 11/480,459, filed Jul. 5, 2006, Dowe, et al.
U.S. Appl. No. 11/332,270, filed Jan. 17, 2006, Monsheimer, et al.
U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.
U.S. Appl. No. 11/561,021, filed Nov. 17, 2006, Simon, et al.
U.S. Appl. No. 10/590,935, filed Aug. 28, 2006, Monsheimer, et al.
U.S. Appl. No. 10/592,952, filed Sep. 15, 2006, Monsheimer, et al.
U.S. Appl. No. 11/587,795, filed Oct. 27, 2006, Monsheimer, et al.
U.S. Appl. No. 11/587,758, filed Oct. 27, 2006, Baumann, et al.
U.S. Appl. No. 11/596,365, filed Nov. 14, 2006, Monsheimer, et al.

* cited by examiner

*Primary Examiner* — Christina Johnson
*Assistant Examiner* — Benjamin Schiffman
(74) *Attorney, Agent, or Firm* — Oblon, Spivak, McClelland, Maier & Neustadt, L.L.P.

(57) ABSTRACT

A process for the production of moldings via a layer-by-layer process by selectively melting regions of one or more powder layers that contain cyclic oligomers and have a median grain diameter determined by laser diffraction of between 25 and 150 µm via input of electromagnetic energy, and permitting the layers to solidify to provide a solid mass, where selectivity is achieved by applying one or more aids amongst the group of susceptors, inhibitors, absorbers, masks, and focusing of a laser beam.

42 Claims, No Drawings

US 7,988,906 B2

THREE-DIMENSIONAL LAYER-BY-LAYER PRODUCTION PROCESS WITH POWDERS BASED ON CYCLIC OLIGOMERS

CROSS-REFERENCE TO RELATED APPLICATIONS

The present application claims priority to German application Serial No. 10 2005 033 379.6, filed on Jul. 16, 2005, the entire contents of which is incorporated herein by reference.

BACKGROUND OF THE INVENTION

1. Field of the Invention

The present invention provides a three-dimensional powder-based production process using powders based on cyclic oligomers, and to moldings produced by this process 2. Discussion of the Background Rapid prototype production is a recently charged task in many areas of endeavor (e.g., automotives, aerospace, sporting equipment, etc.). Generally, desirable processes are those whose operation is based on pulverulent materials and in which the desired structures are produced in a layer-by-layer manner by selective melting and hardening. In these processes there is no need for support structures for overhangs and undercuts, because the powder bed surrounding the molten regions provides sufficient support. In addition, there is no need for a subsequent operation to remove a support. These rapid prototype production processes are also advantageous in that they are suitable for small-run production.

A disadvantage of components produced from an RP process with thermoplastics of the prior art is that these process have restricted use at relatively high temperatures. By way of example, since most of the machines currently available in the market for the processes cannot be heated above 200° C., the type and nature of materials for use therein is severely restricted. Only thermoplastics whose melting point are up to 200° C., or in some instances up to 220° C., can be used with confidence. Heating of the machines is necessary to prevent the curl effect, which occurs if the construction chamber temperature is too low thus resulting in the uppermost layer of the molten region to bend upward at the edges or even over large areas. If this occurs, the next powder layer cannot be applied without breaking the previously melted regions out of the powder bed and, therefore, layer-by-layer production of a molding is impossible.

The curl effect can be eliminated by heating the entire construction chamber to a temperature just below the melting point of the material therein (crystallite melting point in the case of semicrystalline polymers). Accordignly, with the currently available equipment, it is only possible to process polymers whose melting point is up to 200° C. and in limited circumstances up to 220° C. Accordingly, the components produced therewith have insufficient heat resistance for applications above 120° C. This is particularly problematic in the automobile sector where components have to retain adequate strength even at temperatures above 120° C. in order to fulfill their function.

Therefore, there remains a critical need for the development of a process that permits production of moldings with higher heat resistances, using a processing method having maximum reproducibility, on the machines available in the market or on RP/RM machines with limited preheating (e.g., a maximum of 200° C.).

SUMMARY OF THE INVENTION

It is an object of the present invention to provide:
(1) A process for the production of moldings via a layer-by-layer process comprising:
selectively melting regions of one or more powder layers via input of electromagnetic energy, and
permitting the layers to solidify to provide a solid mass,
wherein selectivity is achieved by applying one or more aids selected from the group consisting of susceptors, inhibitors, absorbers, masks, and focusing of a laser beam, and
wherein said powder comprising cyclic oligomers.
(2) The process of (1), wherein the powder comprises at least 50 percent by weight of cyclic oligomers.
(3) The process of (1), wherein the powder comprises at least 60 percent by weight of cyclic oligomers.
(4) The process of (1), wherein the powder comprises at least 70 percent by weight of cyclic oligomers.
(5) The process of (1), wherein the powder comprises at least 30 percent by weight of cyclic oligomers and a filler with a density that is greater than the density of the oligomer.
(6) The process of (1), wherein the powder comprises a shell comprising at least 30 percent by weight of cyclic oligomers and a core comprising a material with a density that is greater than the density of the oligomer.
(7) The process of (1), wherein the powder comprises cyclic oligomers and a catalyst that accelerates opening of the rings of said cyclic oligomers or permits opening of the rings of said cyclic oligomers to permit joinder of a plurality of said rings to produce a polymer chain which is linear or has very little branching.
(8) The process of (7), further comprising one or more additives selected from the group consisting of the fillers, pigments, flow agents, powder-flow aids, and stabilizers.
(9) The process of (1), wherein said powder comprises cyclic oligomers and one or more fillers selected from the group consisting of glass beads, hollow glass microbeads, aluminum flakes, granular aluminum, ceramic particles, carbon fibers, granular metal and metal flakes.
(10) The process of (1), wherein said layer-by-layer process is conducted in a RP/PM machine and the construction chamber of said RP/RM machine is preheated to a temperature between room temperature and the melting point of the powder.
(11) The process of (10), wherein the RP/RM machine operates with layer thicknesses between 0.03 and 1 mm.
(12) The process of (10), wherein the RP/RM machine operates with layer thicknesses between 0.05 and 0.3 mm.
(13) The process of (1), wherein the powder comprises cyclic oligomers and has a bulk density between 200 and 700 g/l to DIN 53466.
(14) The process of (1), wherein the powder comprises cyclic oligomers and has a BET surface area determined according to DIN ISO 9277 of less than 25 m$^2$/g.
(15) The process of (14), wherein the powder comprises cyclic oligomers and has a BET surface area determined according to DIN ISO 9277 of less than 15 m$^2$/g.
(16) The process of (14), wherein the powder comprises cyclic oligomers and has a BET surface area determined according to DIN ISO 9277 of less than 10 m$^2$/g.
(17) The process of (1), wherein the powder comprises cyclic oligomers and has a median grain diameter determined by laser diffraction of between 25 and 150 μm.
(18) The process of (1), wherein the powder comprises cyclic oligomers and has a median grain diameter determined by laser diffraction of between 40 and 100 μm.

(19) The process of (1), wherein the powder comprises cyclic oligomers and has melting point determined via DSC to DIN 53765 that is at least 10° C. lower than that of a product resulting from said process.

(20) The process of (19), wherein the powder comprises cyclic oligomers and has melting point determined via DSC to DIN 53765 that is at least 20° C. lower than that of a product resulting from said process.

(21) The process of (19), wherein the powder comprises cyclic oligomers and has melting point determined via DSC to DIN 53765 that is at least 30° C. lower than that of a product resulting from said process.

(22) The process of (1), wherein the powder comprises cyclic oligomers and has a melt viscosity determined according to DIN 54811 that is significantly lower than that of a product resulting from said process.

(23) The process of (1), wherein the powder comprises cyclic oligomers composed of at least two repeat units in the oligomer ring derived from polyesters or from copolyesters.

(24) The process of (1), wherein the powder further comprises a metal-containing catalyst.

(25) The process of (24), wherein said metal-containing catalyst is a tin-containing catalyst or a titanium-containing catalyst.

(26) The process of (1), wherein the powder comprises cyclic oligomers composed of at least two repeat units in the oligomer ring derived from polyamides or from copolyamides.

(27) The process of (26), wherein said powder further comprises an acidic catalyst.

(28) The process of (27), wherein said acidic catalyst comprises a phosphorus-containing acid or comprises the salt of a phosphorus-containing acid.

(29) The process of (1), wherein the powder comprises cyclic oligomers composed of at least two repeat units in the oligomer ring derived from polysulfides.

(30) The process of (29), wherein the powder further comprises an alkali metal alcoholate.

(31) The process of (1), wherein the powder comprises cyclic oligomers composed of at least two repeat units in the oligomer ring derived from polyethers.

(32) The process of (31), wherein the powder further comprises an alkali metal alcoholate.

(33) The process of (1), wherein the powder comprises cyclic oligomers composed of at least two repeat units in the oligomer ring derived from polyarylene ether ketone.

(34) The process of (33), wherein the further comprises an alkali metal alcoholate.

(35) The process of (1), wherein the powder comprises cyclic oligomers composed of at least two repeat units in the oligomer ring derived from polycarbonate.

(36) The process of (35), wherein the powder further comprises an alkali metal alcoholate.

(37) The process of (1), wherein the powder comprises cyclic oligomers composed of at least two repeat units in the oligomer ring derived from polyimide.

(38) The process of (37), wherein the powder further comprises a catalyst composed of or derived from a sulfonic acid.

(39) The process of (1), wherein the powder comprises cyclic oligomers composed of at least two repeat units in the oligomer ring derived from polyamideimide.

(40) The process of (39), wherein the powder further comprises a catalyst composed of or derived from a sulfonic acid.

(41) The process of (1), wherein the powder comprises cyclic oligomers composed of at least two repeat units in the oligomer ring derived from polyetherimide.

(42) The process of (41), wherein the powder further comprises a catalyst composed of or derived from a sulfonic acid.

(43) The process of (1), wherein the powder comprises cyclic oligomers, and also of a catalyst that accelerates opening of the rings of said cyclic oligomers or permits opening of the rings of said cyclic oligomers to permit joinder of a plurality of said rings to produce a polymer chain which is linear or has very little branching, wherein the catalyst becomes active in the wavelength range of the electromagnetic radiation used in the process.

(44) The process of (1), wherein the powder comprises cyclic oligomers, and also of a catalyst that accelerates opening of the rings of said cyclic oligomers or permits opening of the rings of said cyclic oligomers to permit joinder of a plurality of said rings to produce a polymer chain which is linear or has very little branching, wherein the catalyst becomes active in the wavelength range of the electromagnetic radiation of a downstream processing step.

(45) A molding produced by the process of (1), wherein the temperature of deflection under load to ISO 75 is not more than 40% below the temperature of deflection under load of a molding produced by an alternative method from a polymer composed of the corresponding cyclic polymers used in the process of (1).

(46) The molding of (45), wherein said alternative method is injection molding.

(47) A molding produced by the process of (1), wherein the temperature of deflection under load to ISO 75 is not more than 25% below the temperature of deflection under load of a molding produced by an alternative method from a polymer composed of the corresponding cyclic polymers used in the process of (1).

(48) The molding of (47), wherein said alternative method is injection molding.

(49) A molding produced by the process of (1), wherein the temperature of deflection under load to ISO 75 is not more than 10% below the temperature of deflection under load of a molding produced by an alternative method from a polymer composed of the corresponding cyclic polymers used in the process of (1).

(50) The molding of (49), wherein said alternative method is injection molding.

(51) A molding produced by the process of (1), wherein the density according to DIN 53479 is not more than 20% below the density of a component produced from a polymer corresponding to the cyclic oligomer used.

(52) A molding produced by the process of (1), wherein the density according to DIN 53479 is not more than 10% below the density of a component produced from a polymer corresponding to the cyclic oligomer used.

(53) A molding produced by the process of (1), wherein the density according to DIN 53479 is not more than 8% below the density of a component produced from a polymer corresponding to the cyclic oligomer used.

(54) An automobile molding produced by the process of (1).

(55) An aerospace molding produced by the process of (1).

(56) A sports equipment molding produced by the process of (1).

(57) A molding produced by the process of (1), wherein the melt viscosity of the component according to DIN 54811 is not more than 40% below the melt viscosity of a component produced from a polymer corresponding to the cyclic oligomer used.

(58) A molding produced by the process of (1), wherein the melt viscosity of the component according to DIN 54811 is not more than 30% below the melt viscosity of a component produced from a polymer corresponding to the cyclic oligomer used.

(59) A molding produced by the process of (1), wherein the melt viscosity of the component according to DIN 54811 is not more than 20% below the melt viscosity of a component produced from a polymer corresponding to the cyclic oligomer used.

The above objects highlight certain aspects of the invention. Additional objects, aspects and embodiments of the invention are found in the following detailed description of the invention.

DETAILED DESCRIPTION OF THE INVENTION

Unless specifically defined, all technical and scientific terms used herein have the same meaning as commonly understood by a skilled artisan in chemistry and materials science.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

The present invention relates to a shaping process powders based on cyclic oligomers. The invention also relates to moldings produced via a layer-by-layer process using this powder in which regions of a powder layer are selectively melted. After cooling and hardening of the regions previously subjected to layer-by-layer melting, the molding can be removed from the powder bed.

Selectivity of the layer-by-layer process can be achieved, for example, by application of susceptors, of absorbers, of inhibitors, by masks, by focused introduction of energy (e.g., a laser beam), or by glass fibers. Energy input is achieved by way of electromagnetic radiation.

Some inventive processes are described below which can be used to produce inventive moldings from the powder which comprises cyclic oligomers. However, there is no intention to restrict the invention thereto.

In an embodiment of the present invention, the content of cyclic oligomers in powders used for the inventive process is at least 50% (percent by weight), based on the total amount of powder.

One process that has particularly good suitability for the purposes of rapid prototyping and rapid manufacturing is selective laser sintering. In this process, plastics powders are selectively and briefly irradiated by a laser beam in a chamber. As such, the powder particles impacted by the laser beam are melted. The melted particles coalesce and rapidly solidify to produce a solid mass. Repeated irradiation of a succession of freshly applied layers by this process is a simple and rapid way of producing three-dimensional products.

U.S. Pat. No. 6,136,948 and WO 96/06881 (both DTM Corporation) provide a detailed description of a laser sintering (rapid prototyping) process for production of moldings from pulverulent polymers. A wide variety of polymers and of copolymers are claimed for this application, examples include polyacetate, polypropylene, polyethylene, ionomers, and polyamide.

Other processes with good suitability are SIB process, as described in WO 01/38061, and a process as described in EP 1 015 214. Both processes operate with full-surface infrared heating to melt the powder. The first process achieves melting selectivity by applying an inhibitor, and the second process achieves melting selectivity by a mask. DE 103 11 438 describes another process, in which the energy needed for fusion is introduced by a microwave generator, and selectivity is achieved by a susceptor.

Other suitable processes are those that operate with an absorber, which is either present within the powder or is applied by inkjet methods. These processes are described in DE 10 2004 012 682.8, DE 10 2004 012 683.6, and DE 10 2004 020 452.7.

The rapid prototyping or rapid manufacturing processes (RP or RM processes) mentioned can use pulverulent substrates, in particular polymers. Examples of preferable polymers include polyester, polyvinyl chloride, polyacetal, polypropylene, polyethylene, polystyrene, polycarbonate, Poly(N-methylmethacrylimides) (PMMI), polymethyl methacrylate (PMMA), ionomer, polyamide, or a mixture thereof.

U.S. Pat. No. 6,110,411 describes powders of block copolymers specifically for laser sintering. The block copolymers are composed of a hard segment and a soft segment, where the hard block can contain a polyamide unit, but the soft block is composed of another component, namely of ether units and of ester units.

WO 95/11006 describes a polymer powder suitable for laser sintering that has no overlap of the melting peak and recrystallization peak when melting behavior is determined by differential scanning calorimetry at a scanning rate of from 10 to 20° C./min, and whose degree of crystallinity, likewise determined via DSC, is from 10 to 90%, and whose number-average molecular weight Mn is from 30,000 to 500,000, and whose Mw/Mn quotient is in the range from 1 to 5.

DE 197 47 309 describes the use of a nylon-12 powder with relatively high melting point and with relatively high enthalpy of fusion. The nylon-12 powder is obtained by reprecipitation of a polyamide previously prepared via ring-opening and subsequent polycondensation of laurolactam.

EP 0 699 701 A2 describes the preparation of cyclic polyester oligomers. EP 1 111 012 A1 describes a coating powder which comprises cyclic oligomers. Advantages of the metal structures coated with this powder in the fluidized-bed sintering process or electrostatic spraying process are the hardness and the impact resistance of the coating. The oligomer can be a polyester, polycarbonate, polyamides, polyimide, or a polyamideimide.

As stated above, a disadvantage of components produced from an RP process with thermoplastics of the prior art is that these process have restricted use at relatively high temperatures. By way of example, since most of the machines currently available in the market for the processes cannot be heated above 200° C., the type and nature of materials for use therein is severely restricted. Only thermoplastics whose melting point are up to 200° C., or in some instances up to 220° C., can be used with confidence. Heating of the machines is necessary to prevent the curl effect, which occurs if the construction chamber temperature is too low thus resulting in the uppermost layer of the molten region to bend upward at the edges or even over large areas. If this occurs, the next powder layer cannot be applied without breaking the previously melted regions out of the powder bed and, therefore, layer-by-layer production of a molding is impossible.

Also as stated above, the curl effect can be eliminated by heating the entire construction chamber to a temperature just below the melting point of the material therein (crystallite melting point in the case of semicrystalline polymers). Accordingly, with the currently available equipment, it is only possible to process polymers whose melting point is up to 200° C.

and in limited circumstances up to 220° C. Accordingly, the components produced therewith have insufficient heat resistance for applications above 120° C. This is particularly problematic in the automobile sector where components have to retain adequate strength even at temperatures above 120° C. in order to fulfill their function.

To address the critical need for the development of a process that permits production of moldings with higher heat resistances, using a processing method having maximum reproducibility, on the machines available in the market or on RP/RM machines with limited preheating (e.g., a maximum of 200° C.), the present inventors provide herein a layer-by-layer process in which regions of the respective powder layer are selectively melted by means of electromagnetic energy, and after cooling have become bonded to give the desired molding.

Surprisingly, the present inventors discovered that shaping processes using powder which comprises and/or consists essentially of cyclic oligomers can produce components whose heat resistance is better than that of the prior art. The content of cyclic oligomers in powders used for the inventive process is at least 50% (percent by weight), based on the total amount of powder. Where a large amount of fillers is present and the fillers have density that is greater than that of the oligomer powder, the content of the cyclic oligomers in the entire composition can be reduced to at least 30 percent by weight, and this also applies if the cyclic oligomers occur in the form of a shell with a core composed of other material (sand, metal, ceramic, glass).

Another advantage of the present invention is the reduction in the number of cavities in the components, which is a consequence of the low viscosity of the molten powder. To this end it is advantageous to have a content of at least 60% of cyclic oligomers, based on the total amount of powder, and preferably more than 70%. The mechanical properties here are similar to the properties of a corresponding injection-molded polymer, but reductions have to be accepted in some properties, such as tensile strain at break. However, this is also the case in processes of the prior art, such as laser sintering using material of DE 197 47 309.

The shaping process comprises a layer-by-layer process in which regions of the respective powder bed are selectively melted. Selectivity can be achieved by focused introduction of energy, for example by an appropriately guided laser beam, glass fibers, or by applying inhibitors, susceptors, absorbers, masks. The process permits automated component production without molds.

For the process of the present invention a powder comprising cyclic oligomers is used. The cyclic oligomers can also be a coating on particles whose core is composed of an entirely different material, such as sand, metal, or a plastic. The invention also provides the use of a mixture of particles with cyclic oligomer with other particles, for example composed of the corresponding polymer or of another polymer, or of a filler. If appropriate, the powder comprises other additives, e.g. stabilizers, fillers, pigments, flow agents, and powder-flow aids.

The present invention therefore provides a shaping process using powder which comprises cyclic oligomers, and also provides moldings produced via a layer-by-layer process in which regions of a powder layer are selectively melted, using this powder.

Within the present invention it may be advantageous to preheat the construction chamber of the RP/RM machine. The person skilled in the art can readily ascertain the ideal setting by appropriate trials. The layer thickness is at most 2 mm, preferably between 0.03 and 1 mm, and particularly preferably between 0.05 and 0.3 mm. The upper limit on layer thickness is imposed by the desired resolution of the component and the absorption properties of the electromagnetic waves within the material, and the lower limit is imposed by the minimum possible grain size and the need to use a powder with sufficient flowability.

Typical values for the flowability of the material are powder-flow times between 5 and 10 seconds. Flowability is determined according to DIN 53492. Typical values for bulk density are between 200 and 700 g/l. It is difficult to give a more precise indication because bulk density is highly dependent on fillers or, in the case of a coating with the cyclic oligomer, highly dependent on the core material. Bulk density is determined according to DIN 53466.

At least a portion of the powder used in the present invention and comprising cyclic oligomers has a melting point below that of the corresponding polymer. This melting point is preferably below 220° C., particularly preferably below 200° C. These data are based on the powder or, in the case of multicomponent powders, on portions of the powder. In contrast, the melting point of the components produced by the inventive process is markedly above the melting point of the starting material or, respectively, of portions thereof. Markedly means a difference of more than 110° C., preferably more than 20° C., and particularly preferably more than 30° C.

The various parameters were determined by means of DSC (differential scanning calorimetry) according to DIN 53765, or according to AN-SAA 0663. The measurements were carried out using a Perkin Elmer DSC 7, using nitrogen as flushing gas and a heating rate and cooling rate of 20 K/min.

The BET surface area of the powder which comprises cyclic oligomers is less than 25 m$^2$/g, preferably less than 15 m$^2$/g, and particularly preferably less than 10 m$^2$/g.

The average grain diameter is preferably between 25 and 150 µm, preferably between 30 and 120 µm, and particularly preferably between 40 and 100 µm. The grain size distribution here can be narrow, broad, or else bimodal. The range of grain size is between 0 and 180 µm, preferably between 0 and 120 µm, and particularly preferably between 0 and 100 µm.

BET surface area is determined by gas adsorption using the Brunauer, Emmet and Teller principle; the standard used is DIN ISO 9277.

The values measured for laser diffraction were obtained on a Malvern Mastersizer S, version 2.18.

The melt viscosity of the molten powder is markedly below the viscosity of a molten component, measured according to DIN 54811 or according to ASTM 4440. Given suitable parameters, and in the presence of a suitable catalyst, the cyclic oligomers undergo a ring-opening reaction with subsequent chain extension to form a polymer. The high-molecular-weight polymer formed in the inventive process has very substantially the properties of a polymer prepared conventionally, for example by polycondensation.

Suitable parameters, such as temperature, reaction time, energy input, have to be included in the inventive production process. The temperature is set, first, by preheating of the construction chamber and, second, by the layer-by-lay input of electromagnetic energy. In order to shorten the reaction time, it can be advantageous to operate at a somewhat higher construction chamber temperature, or to irradiate the uppermost layer twice. In one possible embodiment of the inventive process, the ring-opening reaction and subsequent chain extension take place entirely or to some extent in a step downstream of the three-dimensional powder-based moldless production process.

The content of the cyclic oligomers in the component is markedly smaller than in the powder. An HPLC detection method can be used.

The present invention also provides moldings produced by an inventive layer-by-layer process in which regions of the respective layer are selectively melted, using powder which comprises cyclic oligomers and, if appropriate, comprises other additives, e.g. stabilizers, fillers, pigments, flow agents, and powder-flow aids. The moldings have very substantially the properties of moldings composed of a polymer corresponding to the oligomer. In particular, mention may be made of the temperature of deflection under load, and the density, of the components. Surprisingly, particularly high filler levels are possible, for example of glass beads, carbon fibers, metal particles, or ceramic particles, because the viscosity of the cyclic oligomers is very low. This is a particular advantage of the inventive production process, which produces the components without exerting pressure.

An advantage of the inventive process is that moldings produced by the layer-by-layer process in which regions of the respective layer are selectively melted have increased temperature of deflection under load to ISO 75, and density, in comparison with moldings composed of conventional powders, e.g. of polyamide powders.

The reliability of this inventive process is comparable with that of conventional processes. By using appropriate preliminary trials, the person skilled in the art can readily determine the conditions producing optimum properties of the material.

These moldings produced from the inventive powder have good mechanical properties similar to those of moldings produced from conventional nylon-12 powder. When compared with the latter, they have markedly improved temperature of deflection under load to ISO 75. There are moreover fewer cavities in the component. Mechanical properties are approximately the same as those of an injection-molded component composed of the corresponding polymer.

Description of Oligomers

The powders used for the inventive process and comprising at least 50 percent by weight of cyclic oligomers can be composed of the following materials, blends, or powder mixtures:

1.) Pulverulent cyclic oligomers having at least 2 repeat units in the oligomer ring derived from polyesters or from copolyesters, in the absence or presence of a metal-containing catalyst, for example a tin-containing catalyst or titanium-containing catalyst.

2.) Pulverulent cyclic oligomers having at least 2 repeat units in the oligomer ring derived from polyamides or from copolyamides, in the absence or presence of a catalyst that is acidic under process conditions, for example a catalyst having a phosphorus-containing acid or a salt of a phosphorus-containing acid.

3.) Pulverulent cyclic oligomers having at least 2 repeat units in the oligomer ring derived from polysulfides, in the absence or presence of a catalyst which under process conditions has ring-opening activity and has polymerization-accelerating activity, for example a catalyst composed of an alkali metal alcoholate.

4.) Pulverulent cyclic oligomers having at least 2 repeat units in the oligomer ring derived from polyethers, in the absence or presence of a catalyst which under process conditions has ring-opening activity and has polymerization-accelerating activity, for example a catalyst composed of an alkali metal alcoholate.

5.) Pulverulent cyclic oligomers having at least 2 repeat units in the oligomer ring derived from polyarylene ether ketones, in the absence or presence of a catalyst which under process conditions has ring-opening activity and has polymerization-accelerating activity, for example a catalyst composed of an alkali metal alcoholate.

6.) Pulverulent cyclic oligomers having at least 2 repeat units in the oligomer ring derived from polycarbonates, in the absence or presence of a catalyst which under process conditions has ring-opening activity and has polymerization-accelerating activity, for example a catalyst composed of an alkali metal alcoholate.

7.) Pulverulent cyclic oligomers having at least 2 repeat units in the oligomer ring derived from polyimides, in the absence or presence of a catalyst which under process conditions has ring-opening activity and has polymerization-accelerating activity and is acidic, for example a catalyst composed of or derived from a sulfonic acid.

8.) Pulverulent cyclic oligomers having at least 2 repeat units in the oligomer ring derived from polyamideimides, in the absence or presence of a catalyst which under process conditions has ring-opening activity and has polymerization-accelerating activity and is acidic, for example a catalyst composed of or derived from a sulfonic acid.

9.) Pulverulent cyclic oligomers having at least 2 repeat units in the oligomer ring derived from polyetherimides, in the absence or presence of a catalyst which under process conditions has ring-opening activity and has polymerization-accelerating activity and is acidic, for example a catalyst composed of or derived from a sulfonic acid.

The upper limit on the number of repeat units cannot be defined precisely, because, as is also the case with polymers, the cyclic oligomers are a mixture composed of various fractions with different molar masses and therefore with a different number of repeat units of the same monomers. As the number of repeat units rises, the properties of cyclic oligomers increasingly approach the properties of the actual polymer, and it is therefore necessary to formulate the mixture of the cyclic oligomers in such a way that the cyclic oligomers with the highest molar mass have at most 50 repeat units in the ring, preferably 20 repeat units in the ring, and very particularly preferably 10 repeat units in the ring.

Cyclic oligomers having from 2 to 4 repeat units in the ring are particularly suitable, because the melting point is much lower than that of the polymer.

Description of Catalyst

The catalysts in the powder of the present invention serves, under comparatively mild conditions, to accelerate opening of the rings, or to permit opening of the rings where this would otherwise be impossible, in order that a plurality of these rings join to give a polymer chain which is linear or has very little branching (molar mass increase). The component material has the typical physical, mechanical, and chemical properties of the actual polymer only after the rings have become rearranged (molar mass increase) almost entirely to give polymer chains which are linear or have very little branching.

Various catalysts which promote ring-opening and subsequent molar mass increase have to be selected as a function of requirements or polymer type. Examples of known catalyst systems are organometallic catalysts which by way of example have tin atoms or titanium atoms as catalytic center in the molecule, and have stabilization by various organic complexing partners (ligands); inorganic catalysts: e.g. metal oxides (for example very finely divided $TiO_2$ or basic titanium oxides derived therefrom), or catalytically active metals and alloys, metal salts (preferably phosphorus-containing metal salts of the alkali metals and alkaline earth metals, particularly preferably phosphorus-containing metal salts of the alkali metals whose phosphorus atoms have an oxidation state below that (5) typical of phosphorus); mineral acids (preferably phosphorus-containing mineral acids, particularly preferably phosphorus-containing mineral acids whose phosphorus atoms have an oxidation state below that (5) typical of phosphorus), organic acids, inorganic and organic bases, Lewis acid and Lewis bases, and also catalysts which become active on interacting with electromagnetic waves. These catalysts can be those that become active in the wavelength range of the electromagnetic radiation used in the shaping process described according to the invention, or can be those which become active in a wavelength range other than that used in the shaping process described according to the invention.

A plurality of fundamental issues have to be considered in selection of the catalysts, including: 1. polymer to be processed, 2. polymerization process, 3. construction chamber temperature, 4. duration of process.

In order to avoid uncontrolled polymerization of the rings prior to irradiation and at the unirradiated sites within the construction chamber, the catalyst must be inactive at the temperature of the construction chamber. It is preferable to use a catalyst which requires a temperature markedly above the temperature of the construction chamber (i.e. according to the invention at least 10° C. thereabove) before its activity increases (i.e. before the polymer-formation rate constant $k_p$ is at least doubled at the higher temperature). It is particularly preferable to use a catalyst that requires a temperature markedly above the temperature of the construction chamber (i.e. according to the invention at least 10° C. thereabove) before it becomes catalytically active (i.e. the polymer-formation rate constant $k_p$ being at least ten times greater at the higher temperature). As a function of the polymer, relatively long construction times are to be expected if ring cleavage and subsequent chain formation proceeds relatively slowly in comparison with the irradiation time of a layer. In very specific cases, more than one irradiation is needed.

As a function of polymer type, it is possible that, despite use of a catalyst, only a small portion of the rings is cleaved during the construction phase, and also that no linear or partially branched polymer can be produced. In these cases, the molar mass increase phase cannot take place until the construction phase has ended. For the subsequent molar mass increase process it is preferable to use thermal processes and processes assisted by electromagnetic radiation, particularly preferably thermal processes assisted by oxygen (calcining), and processes assisted by UV radiation, using a catalyst.

Milling of the Material

Powders for use in the inventive process are obtained by grinding, preferably at low temperatures, particularly preferably below 0° C., and very particularly preferably below −25° C., using as starting material a material that comprises at least one cyclic oligomer. Suitable equipment for the grinding process are, inter alia, pinned-disk mills, fluidized-bed opposed-jet mills, and baffle-plate impact mills.

Powder Preparation

Post-treatment in a high-shear mixer, preferably at temperatures above the glass transition temperature of the polymer, can follow in order to round the grains and thus improve flowability. Fractionation can also improve the properties of the powder, for example by sieving or sifting. Addition of powder-flow aids of the prior art can also follow. Surprisingly, these measures can produce a powder with good processing properties, permitting reliable and commercially useful processing by an inventive process.

Commercially obtainable products are the precursor products for polybutylene terephthalate from Cyclics Europe GmbH, Germany, for example CBT 100 or CBT 200.

Powder used in the inventive process can also comprise auxiliaries and/or fillers and/or other organic or inorganic pigments. By way of example, these auxiliaries can be powder-flow aids, e.g. precipitated and/or fumed silicas. By way of example, precipitated silicas are supplied with the product name Aerosil, with various specifications, by Degussa AG. The powder preferably comprises less than 3% by weight of these fillers, preferably from 0.001 to 2% by weight, and very particularly preferably from 0.05 to 1% by weight, based on the entirety of the polymers present. By way of example, the fillers can be glass particles, metal particles, or ceramic particles, e.g. glass beads, steel shot, or granular metal, or foreign pigments, e.g. transition metal oxides. The pigments can by way of example be titanium dioxide particles based on rutile (preferably) or anatase, or can be carbon black particles.

The median particle size of the filler particles is preferably smaller than or approximately equal to that of the particles comprising cyclic oligomers. The median particle size $d_{50}$ of the fillers should preferably not exceed the median particle size $d_{50}$ of the particles comprising cyclic oligomers by more than 20%, preferably 15%, and very particularly preferably 5%. A particular restriction on the particle size results from the permissible overall height or layer thickness in the rapid prototyping/rapid manufacturing system.

The polymer powder used in the inventive process preferably comprises less than 75% by weight, with preference from 0.001 to 70% by weight, with particular preference from 0.05 to 50% by weight, and with very particular preference from 0.5 to 25% by weight, of these fillers, based on the entirety of the cyclic oligomers and, respectively, polymers present.

If as stated maximum limits for auxiliaries and/or fillers are exceeded, as a function of the filler or auxiliary used the result can be marked impairment of mechanical properties of moldings produced by means of these powders.

It is also possible to mix conventional polymer powders with powders which comprise cyclic oligomer and to use them in an inventive process. This method can produce polymer powders with improved processibility in an RP/RM system. The process for preparation of these mixtures can be found by way of example in DE 34 41 708.

To improve processibility, or for further modification of the powder, it can receive admixtures of inorganic foreign pigments, e.g. transition metal oxides, stabilizers, e.g. phenols, in particular sterically hindered phenols, flow agents and powder-flow aids, e.g. fumed silicas, and also filler particles. The amount of these substances added, based on the total weight of polymers and, respectively, oligomers in the powder is preferably such as to comply with the stated concentrations of fillers and/or auxiliaries for the powder to be used in the inventive process.

The present invention also provides processes for production of moldings by layer-by-layer processes in which regions of the respective layer are selectively melted, using powder, these consisting in essence of cyclic oligomers.

The energy for the process of the present invention is introduced by electromagnetic radiation, and selectivity is introduced, for example, by masks, application of inhibitors, absorbers, susceptors, or by focusing of the radiation (for example via lasers). The electromagnetic radiation encompasses the range from 100 nm to 10 cm, preferably between 400 nm and 10 600 nm, and particularly preferably 10 600 nm ($CO_2$ laser) or from 800 to 1060 nm (diode laser, Nd:YAG laser, or appropriate lamps and sources). By way of example, the radiation source can be a microwave generator, a suitable laser, a radiant heater, or a lamp, or else a combination thereof. After cooling of all of the layers, the inventive molding can be removed. It can be advantageous to control the temperature of the construction chamber of the machine. The ideal process conditions for the powder used can easily be discovered by the person skilled in the art via suitable preliminary trials. Preheat temperature and amount of energy introduced, duration of exposure to energy, and wavelength of the electromagnetic energy are to be carefully matched to the cyclic oligomer and to the catalyst used.

The examples below of these processes serve for illustration, without any intention to restrict the invention thereto.

Laser sintering processes are well known and are based on selective sintering of polymer particles, layers of polymer particles being briefly exposed to laser light, and the polymer particles exposed to the laser light thus becoming bonded to one another. Successive sintering of layers of polymer particles produces three-dimensional objects. Details of the selective laser sintering process can be found by way of example in the specifications U.S. Pat. No. 6,136,948 and WO 96/06881.

The inventive layer-by-layer powder-based three-dimensional process in which a powder which comprises cyclic oligomers is used can be employed to produce components in which different component properties are established from layer to layer or even within a layer. Component properties can be set within a wide range via the processing parameters (duration of exposure to the electromagnetic radiation, intensity, and others). By way of example, this method can produce a molding which has hard and soft regions.

Other processes with good suitability are SIB process, as described in WO 01/38061, and a process as described in EP 1 015 214. Both processes operate with full-surface infrared heating to melt the powder. The first process achieves selectivity of melting via application of an inhibitor, and the second process achieves this via a mask. DE 103 11 438 describes another process. In this process, the energy needed for fusion is introduced via a microwave generator, and selectivity is achieved via application of a susceptor.

Other suitable processes are those which operate with an absorber, which is either present within the powder or is applied by inkjet methods, as described in DE 10 2004 012 682.8, DE 10 2004 012 683.6, and DE 10 2004 020 452.7.

In order to obtain ideal results, the powder and the process have to be matched to one another. For example, for powder-application systems that use gravity it can be advantageous to use suitable prior-art measures to increase the flowability of the powder. Preheating of the construction chamber, or else of the powder, can have a favorable effect on processibility and on component quality. Another method of obtaining good results uses a different, mostly higher, energy input in treating the first layers of a component than in treating the subsequent layers. There is a wide variety of possible settings, not all of which are listed here, for example in relation to power, exposure time, and frequency of electromagnetic radiation; however, they can easily be determined by the person skilled in the art in preliminary trials.

A feature of the inventive moldings produced by a layer-by-layer process in which regions are selectively melted is that they use powders which comprise at least one cyclic oligomer.

The moldings can also comprise fillers and/or auxiliaries (the data applicable here being the same as those for the powder), by way of example heat stabilizers, e.g. sterically hindered phenol derivatives. Examples of fillers can be glass particles, ceramic particles, and also metal particles, e.g. iron shot, or corresponding hollow beads. The inventive moldings preferably comprise glass particles, very particularly preferably glass beads, and also hollow glass microbeads. Other preferred embodiments are those with aluminum powder or aluminum flakes, or with carbon fibers, unmilled or milled, or ceramic particles. Inventive moldings preferably comprise less than 3% by weight, particularly preferably from 0.001 to 2% by weight, and very particularly preferably from 0.05 to 1% by weight, of these auxiliaries, based on the entirety of the polymers present. Inventive moldings also preferably comprise less than 75% by weight, preferably from 0.001 to 70% by weight, particularly preferably from 0.05 to 50% by weight, and very particularly preferably from 0.5 to 25% by weight, of these fillers, based on the entirety of the polymers present.

The temperature of deflection under load of the inventive components to ISO 75 is close to the temperature of deflection under load of components composed of the polymer corresponding to the cyclic oligomer. The components here are those produced by a suitable production process, preferably by means of injection molding. The difference is less than 40%, preferably less than 25%, and particularly preferably less than 10%.

The density of the inventive components is likewise close to the density of components injection-molded or produced by another suitable production process and composed of the polymer corresponding to the cyclic oligomer. The difference is less than 20%, preferably less than 10%, and particularly preferably less than 8%.

There are also advantages to be found when using fillers. The low viscosity of the powder melted via the electromagnetic energy leads to excellent flow around fillers and other particles added to the powder in the dry blend. It can also be advantageous to use nanoscale particles.

The DIN 54811 viscosity of the inventive components is also close to the viscosity of components composed of the polymer corresponding to the cyclic oligomer. The components here are those produced by a suitable production process, preferably by means of injection molding. The difference is less than 40%, preferably less than 30%, and particularly preferably less than 20%.

The detectable contents of oligomers in the component produced by the inventive process are below the content of oligomers in the corresponding powder used in the inventive process. The content of oligomers or cyclooligomers present in the finished component is in the range of <10% by weight, preferably of <1% by weight, particularly preferably of <0.5% by weight.

There are application sectors for these moldings both in rapid prototyping and in rapid manufacturing. The latter certainly means short runs (i.e. production of more than one identical part) for which however production by means of an injection mold is uneconomic. Examples of these are parts for high-specification cars of which only small numbers are produced, or replacement parts for motor sports, in which the important factor is not only the small numbers but also the availability time. Industries using the inventive parts can be the aerospace industry, medical technology, mechanical engineering, car production, the sports industry, the household goods industry, the electrical industry, and the lifestyle sector.

The above written description of the invention provides a manner and process of making and using it such that any person skilled in this art is enabled to make and use the same, this enablement being provided in particular for the subject matter of the appended claims, which make up a part of the original description.

As used herein, the phrases "selected from the group consisting of," "chosen from," and the like include mixtures of the specified materials.

Where a numerical limit or range is stated herein, the endpoints are included. Also, all values and subranges within a numerical limit or range are specifically included as if explicitly written out.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

Having generally described this invention, a further understanding can be obtained by reference to certain specific examples, which are provided herein for purposes of illustration only, and are not intended to be limiting unless otherwise specified.

Numerous modifications and variations on the present invention are possible in light of the above teachings. It is, therefore, to be understood that within the scope of the accompanying claims, the invention may be practiced otherwise than as specifically described herein.

The invention claimed is:

1. A process for the production of moldings via a layer-by-layer process comprising:
   selectively melting regions of one or more powder layers via input of electromagnetic energy, and
   permitting the layers to solidify to provide a solid mass,
   wherein selectivity is achieved by applying one or more aids selected from the group consisting of susceptors, inhibitors, absorbers, masks, and focusing of a laser beam,
   wherein said powder comprising cyclic oligomers and has a median grain diameter determined by laser diffraction of between 25 and 150 μm, and
   wherein the powder comprises a shell comprising at least 30 percent by weight of cyclic oligomers and a core comprising a material with a density that is greater than the density of the oligomer.

2. The process of claim 1, wherein the powder comprises at least 50 percent by weight of cyclic oligomers.

3. The process of claim 1, wherein the powder comprises at least 60 percent by weight of cyclic oligomers.

4. The process of claim 1, wherein the powder comprises at least 70 percent by weight of cyclic oligomers.

5. The process of claim 1, wherein the powder comprises at least 30 percent by weight of cyclic oligomers and a filler with a density that is greater than the density of the oligomer.

6. The process of claim 1, wherein the powder comprises cyclic oligomers and a catalyst that accelerates opening of the rings of said cyclic oligomers or permits opening of the rings of said cyclic oligomers to permit joinder of a plurality of said rings to produce a polymer chain which is linear or has very little branching.

7. The process of claim 6, further comprising one or more additives selected from the group consisting of the fillers, pigments, flow agents, powder-flow aids, and stabilizers.

8. The process of claim 1, wherein said powder comprises cyclic oligomers and one or more fillers selected from the group consisting of glass beads, hollow glass microbeads, aluminum flakes, granular aluminum, ceramic particles, carbon fibers, granular metal and metal flakes.

9. The process of claim 1, wherein said layer-by-layer process is conducted in a RP/RM machine and the construction chamber of said RP/RM machine is preheated to a temperature between room temperature and the melting point of the powder.

10. The process of claim 9, wherein the RP/RM machine operates with layer thicknesses between 0.03 and 1 mm.

11. The process of claim 9, wherein the RP/RM machine operates with layer thicknesses between 0.05 and 0.3 mm.

12. The process of claim 1, wherein the powder comprises cyclic oligomers and has a bulk density between 200 and 700 g/l to DIN 53466.

13. The process of claim 1, wherein the powder comprises cyclic oligomers and has a BET surface area determined according to DIN ISO 9277 of less than 25 $m^2/g$.

14. The process of claim 13, wherein the powder comprises cyclic oligomers and has a BET surface area determined according to DIN ISO 9277 of less than 15 $m^2/g$.

15. The process of claim 13, wherein the powder comprises cyclic oligomers and has a BET surface area determined according to DIN ISO 9277 of less than 10 $m^2/g$.

16. The process of claim 1, wherein the powder comprises cyclic oligomers and has a median grain diameter determined by laser diffraction of between 40 and 100 μm.

17. The process of claim 1, wherein the powder comprises cyclic oligomers and has melting point determined via DSC to DIN 53765 that is at least 10° C. lower than that of a product resulting from said process.

18. The process of claim 17, wherein the powder comprises cyclic oligomers and has melting point determined via DSC to DIN 53765 that is at least 20° C. lower than that of a product resulting from said process.

19. The process of claim 17, wherein the powder comprises cyclic oligomers and has melting point determined via DSC to DIN 53765 that is at least 30° C. lower than that of a product resulting from said process.

20. The process of claim 1, wherein the powder comprises cyclic oligomers and has a melt viscosity determined according to DIN 54811 that is significantly lower than that of a product resulting from said process.

21. The process of claim 1, wherein the powder comprises cyclic oligomers composed of at least two repeat units in the oligomer ring derived from polyesters or from copolyesters.

22. The process of claim 1, wherein the powder further comprises a metal-containing catalyst.

23. The process of claim 22, wherein said metal-containing catalyst is a tin-containing catalyst or a titanium-containing catalyst.

24. The process of claim 1, wherein the powder comprises cyclic oligomers composed of at least two repeat units in the oligomer ring derived from polyamides or from copolyamides.

25. The process of claim 24, wherein said powder further comprises an acidic catalyst.

26. The process of claim 25, wherein said acidic catalyst comprises a phosphorus-containing acid or comprises the salt of a phosphorus-containing acid.

27. The process of claim 1, wherein the powder comprises cyclic oligomers composed of at least two repeat units in the oligomer ring derived from polysulfides.

28. The process of claim 27, wherein the powder further comprises an alkali metal alcoholate.

29. The process of claim 1, wherein the powder comprises cyclic oligomers composed of at least two repeat units in the oligomer ring derived from polyethers.

30. The process of claim 29, wherein the powder further comprises an alkali metal alcoholate.

31. The process of claim 1, wherein the powder comprises cyclic oligomers composed of at least two repeat units in the oligomer ring derived from polyarylene ether ketone.

32. The process of claim 31, wherein the further comprises an alkali metal alcoholate.

33. The process of claim 1, wherein the powder comprises cyclic oligomers composed of at least two repeat units in the oligomer ring derived from polycarbonate.

34. The process of claim 33, wherein the powder further comprises an alkali metal alcoholate.

35. The process of claim 1, wherein the powder comprises cyclic oligomers composed of at least two repeat units in the oligomer ring derived from polyimide.

36. The process of claim 35, wherein the powder further comprises a catalyst composed of or derived from a sulfonic acid.

37. The process of claim 1, wherein the powder comprises cyclic oligomers composed of at least two repeat units in the oligomer ring derived from polyamideimide.

38. The process of claim 37, wherein the powder further comprises a catalyst composed of or derived from a sulfonic acid.

39. The process of claim 1, wherein the powder comprises cyclic oligomers composed of at least two repeat units in the oligomer ring derived from polyetherimide.

40. The process of claim 39, wherein the powder further comprises a catalyst composed of or derived from a sulfonic acid.

41. The process of claim 1, wherein the powder comprises cyclic oligomers, and also of a catalyst that accelerates opening of the rings of said cyclic oligomers or permits opening of the rings of said cyclic oligomers to permit joinder of a plurality of said rings to produce a polymer chain which is linear or has very little branching, wherein the catalyst becomes active in the wavelength range of the electromagnetic radiation used in the process.

42. The process of claim 1, wherein the powder comprises cyclic oligomers, and also of a catalyst that accelerates opening of the rings of said cyclic oligomers or permits opening of the rings of said cyclic oligomers to permit joinder of a plurality of said rings to produce a polymer chain which is linear or has very little branching, wherein the catalyst becomes active in the wavelength range of the electromagnetic radiation of a downstream processing step.

* * * * *